(12) United States Patent
Coakley

(10) Patent No.: US 10,436,245 B2
(45) Date of Patent: Oct. 8, 2019

(54) BEARING ASSEMBLY FOR A PIPE MACHINING APPARATUS

(71) Applicant: ILLINOIS TOOL WORKS INC., Glenview, IL (US)

(72) Inventor: Roy C. Coakley, Northlake, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 2 days.

(21) Appl. No.: 15/468,365

(22) Filed: Mar. 24, 2017

(65) Prior Publication Data

US 2017/0191525 A1    Jul. 6, 2017

Related U.S. Application Data

(62) Division of application No. 13/796,211, filed on Mar. 12, 2013, now Pat. No. 9,638,245.

(Continued)

(51) Int. Cl.
*B23B 5/08* (2006.01)
*B23B 5/14* (2006.01)
(Continued)

(52) U.S. Cl.
CPC ............. *F16C 19/54* (2013.01); *B23B 3/26* (2013.01); *B23B 3/265* (2013.01); *B23B 5/162* (2013.01);
(Continued)

(58) Field of Classification Search
CPC ....... B23B 2260/00; B23B 3/26; B23B 3/265; B23B 5/162; B23B 5/163; F16C 19/54; B23D 21/04; B23Q 9/0021; B23Q 1/40
See application file for complete search history.

(56) References Cited

U.S. PATENT DOCUMENTS

| 1,140,208 A | 5/1915 | Taylor |
| 1,886,082 A | 11/1932 | Chapman |

(Continued)

FOREIGN PATENT DOCUMENTS

| CN | 85102879 A | 1/1986 |
| CN | 87101953 A | 9/1988 |

(Continued)

OTHER PUBLICATIONS

International Search Report for PCT/US2014/058814, dated Dec. 15, 2014, 3 pages.

(Continued)

*Primary Examiner* — Sara Addisu
(74) *Attorney, Agent, or Firm* — Klintworth & Rozenblat IP LLP

(57) ABSTRACT

Pipe machining apparatuses and bearing assemblies are provided. In one aspect, a pipe machining apparatus includes a frame, a tool carrier, a first roller bearing and a second roller bearing. The tool carrier is coupled to and movable relative to the frame and defines a race therein. The first roller bearing includes a first shaft and a first roller rotatably coupled to the first shaft. The first roller is at least partially positioned in the race and is rotatable about a first roller bearing axis adapted to remain substantially fixed relative to the frame. The second roller bearing includes a second shaft and a second roller rotatably coupled to the second shaft. The second roller is at least partially positioned in the race and is rotatable about a second roller bearing axis. The second roller bearing is adjustable to move the second roller bearing axis relative to the frame.

5 Claims, 7 Drawing Sheets

Related U.S. Application Data

(60) Provisional application No. 61/709,531, filed on Oct. 4, 2012.

(51) Int. Cl.
  *B23B 5/16* (2006.01)
  *B23D 21/04* (2006.01)
  *F16C 19/54* (2006.01)
  *B23B 3/26* (2006.01)
  *B23Q 9/00* (2006.01)
  *B23Q 9/02* (2006.01)
  *B23Q 1/40* (2006.01)

(52) U.S. Cl.
  CPC ............ *B23B 5/163* (2013.01); *B23D 21/04* (2013.01); *B23Q 1/40* (2013.01); *B23Q 9/0021* (2013.01); *B23Q 9/02* (2013.01); *B23B 2260/008* (2013.01); *Y10T 83/68* (2015.04)

(56) References Cited

U.S. PATENT DOCUMENTS

| | | |
|---|---|---|
| 2,358,741 A | 9/1944 | Shelby |
| 2,364,963 A | 12/1944 | Elliott |
| 2,635,270 A | 4/1953 | Dawson |
| 2,798,390 A | 7/1957 | Bennett |
| 2,931,659 A | 4/1960 | Novkov |
| 2,968,375 A | 1/1961 | Avery, Sr. |
| 3,253,336 A | 5/1966 | Brown |
| 3,431,646 A | 3/1969 | Young |
| 3,732,758 A | 5/1973 | Rinaldo |
| 3,807,047 A | 4/1974 | Sherer |
| 3,942,248 A | 3/1976 | Sherer |
| 4,112,794 A | 9/1978 | Franks |
| 4,289,430 A | 9/1981 | Shashaty |
| 4,318,391 A | 3/1982 | Wachs et al. |
| 4,366,994 A | 1/1983 | Yoshioka |
| 4,397,487 A | 8/1983 | Guttman |
| 4,411,178 A | 10/1983 | Wachs |
| 4,421,441 A | 12/1983 | Hirose |
| 4,483,223 A | 11/1984 | Nall et al. |
| 4,490,909 A | 1/1985 | Wachs et al. |
| 4,493,150 A | 1/1985 | Garcia |
| 4,543,861 A | 10/1985 | Kwech et al. |
| 4,608,755 A | 9/1986 | Braasch |
| 4,637,285 A | 1/1987 | Mizoguchi |
| 4,655,108 A | 4/1987 | Galos |
| 4,677,884 A | 7/1987 | Kwech et al. |
| 4,739,685 A | 4/1988 | Ricci et al. |
| 4,754,672 A | 7/1988 | VanderPol |
| 4,762,038 A | 8/1988 | Olson |
| 4,770,074 A | 9/1988 | Kwech |
| 4,791,842 A | 12/1988 | Olson |
| 4,813,314 A | 3/1989 | Kwech |
| 4,829,860 A | 5/1989 | VanderPol |
| 4,880,340 A | 11/1989 | Taki et al. |
| 4,939,964 A | 7/1990 | Ricci |
| 5,002,440 A | 3/1991 | Tamaoki et al. |
| 5,013,015 A | 5/1991 | Fatheree |
| 5,050,291 A | 9/1991 | Gilmore |
| 5,054,342 A | 10/1991 | Swiatowy et al. |
| 5,070,600 A | 12/1991 | Brew et al. |
| 5,199,928 A | 4/1993 | Gress et al. |
| 5,361,659 A | 11/1994 | Hanson |
| 5,368,399 A | 11/1994 | Tremblay |
| 5,549,024 A | 8/1996 | Ricci et al. |
| 5,557,995 A | 9/1996 | Robinson |
| 5,603,250 A | 2/1997 | Robinson |
| 5,609,081 A | 3/1997 | Lin |
| 5,660,093 A | 8/1997 | Ricci |
| 5,775,188 A | 7/1998 | Strait |
| 5,894,772 A | 4/1999 | Nodar |
| 5,941,145 A | 8/1999 | Marshall |
| 5,943,927 A | 8/1999 | Hanson |
| 5,954,462 A | 9/1999 | Way et al. |
| 6,065,378 A | 5/2000 | Ricci |
| 6,227,577 B1 | 5/2001 | Ikeda et al. |
| 6,257,110 B1 | 7/2001 | Ricci et al. |
| 6,615,696 B2 | 9/2003 | Ricci |
| 7,000,510 B1 | 2/2006 | Place |
| 7,383,758 B2 | 6/2008 | Place |
| 7,793,574 B2 | 9/2010 | Sorensen |
| 8,250,953 B2 | 8/2012 | Hall |
| 8,534,170 B2 | 9/2013 | Arnemann |
| 9,050,669 B2 | 6/2015 | Coakley |
| 2004/0035171 A1 | 2/2004 | Gormany |
| 2004/0234352 A1 | 11/2004 | Vanderpol |
| 2005/0132851 A1 | 6/2005 | Place |
| 2006/0207395 A1 | 9/2006 | Place et al. |
| 2009/0191040 A1 | 7/2009 | Liu et al. |
| 2010/0062887 A1 | 3/2010 | Bodensteiner et al. |
| 2010/0162860 A1 | 7/2010 | Hall et al. |
| 2011/0219920 A1 | 9/2011 | Arnemann |
| 2014/0190327 A1 | 7/2014 | Pierce |

FOREIGN PATENT DOCUMENTS

| | | |
|---|---|---|
| CN | 2109276 U | 7/1992 |
| CN | 2254385 Y | 5/1997 |
| CN | 2274107 Y | 2/1998 |
| CN | 1424155 A | 6/2003 |
| CN | 2761329 Y | 3/2006 |
| CN | 201482987 U | 5/2010 |
| DE | 900042 C | 12/1953 |
| DE | 2439852 A | 4/1976 |
| DE | 3603618 C1 | 10/1987 |
| DE | 4240637 C1 | 6/1994 |
| DE | 10020393 A1 | 2/2001 |
| DE | 10 2009 005983 A1 | 7/2010 |
| EP | 0733425 A2 | 9/1996 |
| EP | 0819501 A1 | 1/1998 |
| FR | 2641487 | 7/1990 |
| GB | 2242850 A | 10/1991 |
| WO | 2010077349 A1 | 7/2010 |
| WO | 2012/071419 A1 | 5/2012 |
| WO | 2014055610 A1 | 4/2014 |
| WO | 2014/109910 | 7/2014 |

OTHER PUBLICATIONS

Communication pursuant to Rule 164(2)(b) and Article 94(3) EPC issued for EP 13 779 984.7-1019 dated Jan. 16, 2018, 6 pages.
International Search Report and Written Opinion for PCT/US2013/062999 dated Jan. 29, 2014, 12 pages.
International Search Report and Written Opinion for PCT/US2013/062987 dated Feb. 20, 2014, 11 pages.
International Search Report and Written Opinion for International Patent Application No. PCT/US2013/063023 dated Jun. 2, 2014, 16 pages.
International Search Report and Written Opinion for PCT/US2013/063007, dated Jan. 22, 2014, 14 pages.
International Search Report and Written Opinion for PCT/US2015/056015 dated Mar. 31, 2016, 19 pages.
International Search Report and Written Opinion for PCT/US2015/056006 dated Mar. 31, 2016, 17 pages.
HST2121, "H&S Tool Clamshell.mpg," Dec. 22, 2009, Published on YouTube, https://www.youtube.com/watch?v=Okfh-ODTj-8.

BEARING ASSEMBLY FOR A PIPE MACHINING APPARATUS

RELATED APPLICATIONS

The present application is a divisional of co-pending U.S. Non-Provisional patent application Ser. No. 13/796,211, filed Mar. 12, 2013, which claims the benefit of U.S. Provisional Patent Application No. 61/709,531, filed Oct. 4, 2012, all of which are incorporated by reference herein in their entirety.

FIELD OF THE INVENTION

The present disclosure generally relates to pipe machining apparatuses and, more particularly, to pipe machining apparatuses for machining large diameter pipes.

BACKGROUND

A variety of different types of pipe machining apparatuses exist to perform various machining processes on pipes. One such process includes cutting pipes. Large diameter pipes may be cut with a split frame pipe machining apparatus, which includes two frame halves that surround the pipe from respective sides and are fixedly coupled together around the pipe and fixedly coupled to the pipe. Such a pipe cutter includes a tool carrier for supporting a tool or cutting device and the tool carrier encircles the pipe and moves toward the pipe in small increments during the cutting process in order to slowly cut into the pipe. Eventually, after many small increments of adjustment toward the pipe, the pipe will be completely cut.

A bearing assembly comprising a plurality of roller bearings is disposed between the fixed frame and the rotatable tool carrier. Such roller bearings undergo significant and various forces due to the numerous encirclements of the tool carrier relative to the frame, which can provide a detrimental effect to the machining capability of the pipe machining apparatus or may prematurely wear the roller bearings or other components of the pipe machining apparatus. In addition, these roller bearings create chatter or unwanted vibrations during operation of the pipe machining apparatus.

It would therefore be desirable to provide a bearing assembly between the fixed frame and the rotatable tool carrier that provides effective guidance of the tool carrier relative to the fixed frame during operation of a pipe machining apparatus, provides improved machining capability of the pipe machining apparatus, and inhibits chatter during operation.

SUMMARY

The present disclosure is defined by the following claims, and nothing in this section should be taken as a limitation on those claims.

In one aspect, a pipe machining apparatus is provided and includes a frame, a tool carrier coupled to and movable relative to the frame, and the tool carrier defines a race therein. The pipe machining apparatus also includes a first roller bearing including a first shaft and a first roller rotatably coupled to the first shaft, the first roller is at least partially positioned in the race and is rotatable about a first roller bearing axis adapted to remain substantially fixed relative to the frame. The pipe machining apparatus further including a second roller bearing including a second shaft and a second roller rotatably coupled to the second shaft, the second roller is at least partially positioned in the race and is rotatable about a second roller bearing axis, and the second roller bearing is adjustable to move the second roller bearing axis relative to the frame.

In another aspect, a pipe machining apparatus is provided and includes a frame and a tool carrier coupled to and movable relative to the frame, the tool carrier defining a race therein. The race includes an interior bearing surface including an indentation and an exterior bearing surface that is substantially flat. The pipe machining apparatus also includes a first roller bearing including a first shaft and a first roller rotatably coupled to the first shaft, the first roller is at least partially positioned in the race and engages the exterior bearing surface. The pipe machining apparatus further includes a second roller bearing including a second shaft and a second roller rotatably coupled to the second shaft, the second roller is at least partially positioned in the race and engages the interior bearing surface in the indentation.

In a further aspect, a bearing assembly for a pipe machining apparatus is provided. The bearing assembly includes a plurality of fixed roller bearings with each fixed roller bearing including a first shaft and a first roller rotatably coupled to the first shaft, the first roller is rotatable about a first roller bearing axis adapted to remain substantially fixed. The pipe machining apparatus also includes a plurality of adjustable roller bearings with each adjustable roller bearing including a second shaft and a second roller rotatably coupled to the second shaft, the second roller is rotatable about a second roller bearing axis adapted to move. The plurality of fixed roller bearings and the plurality of adjustable roller bearings alternate relative to each other.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
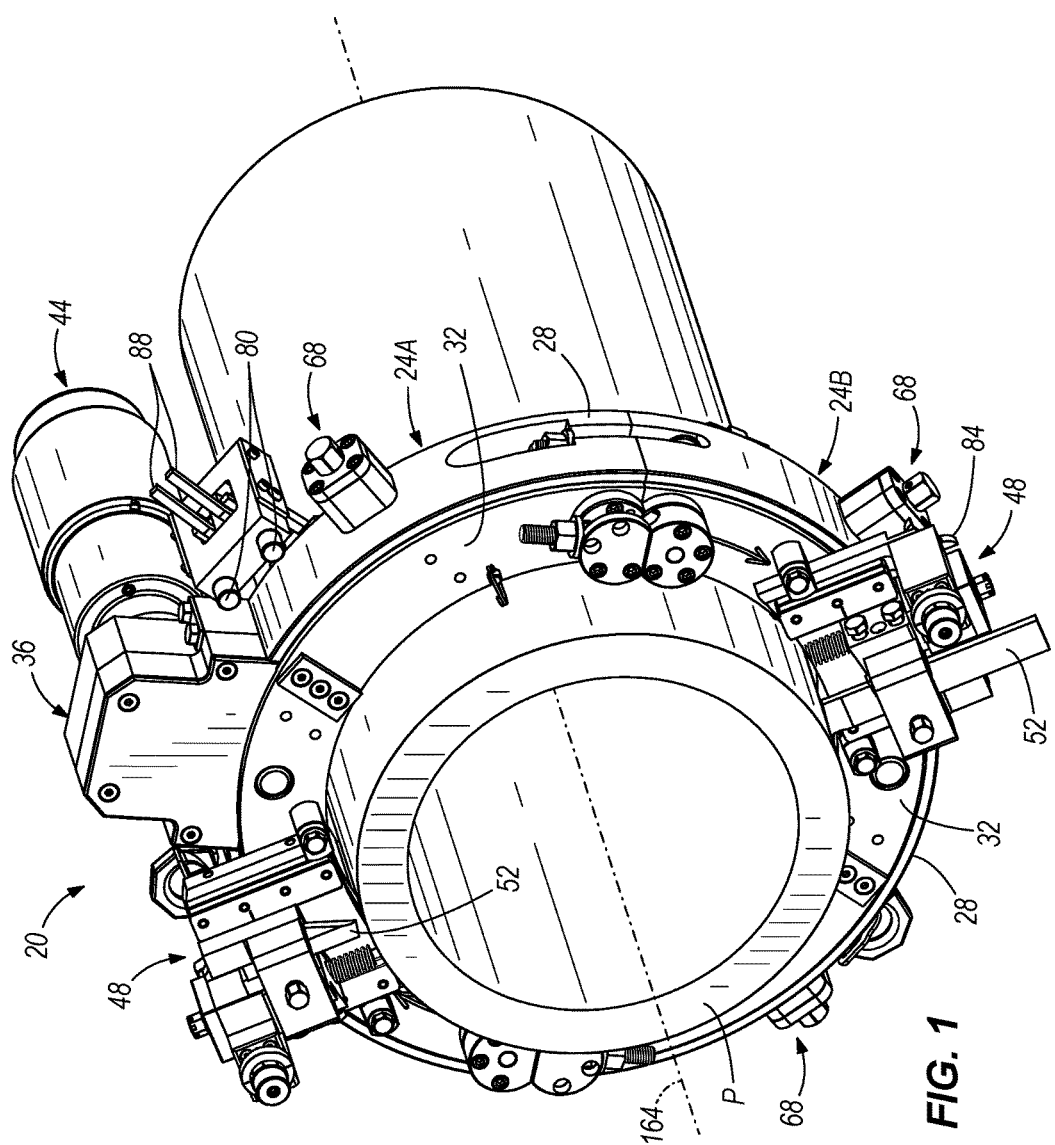
FIG. 1 is a top front perspective view of an exemplary pipe machining apparatus coupled to a pipe, in accordance with one embodiment.
Figure 2:
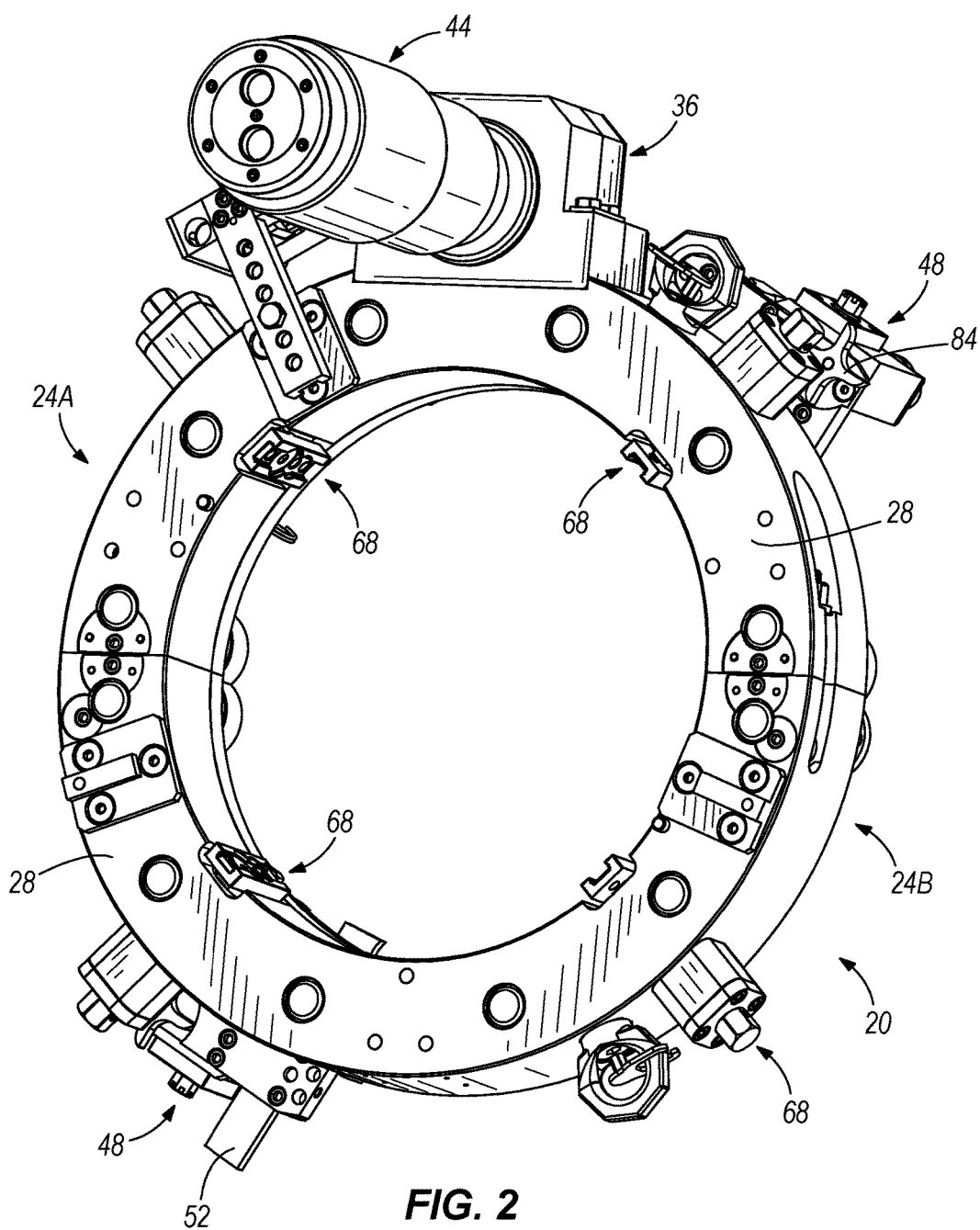
FIG. 2 is a bottom rear perspective view of the pipe machining apparatus illustrated in FIG. 1, in accordance with one embodiment.
Figure 3:
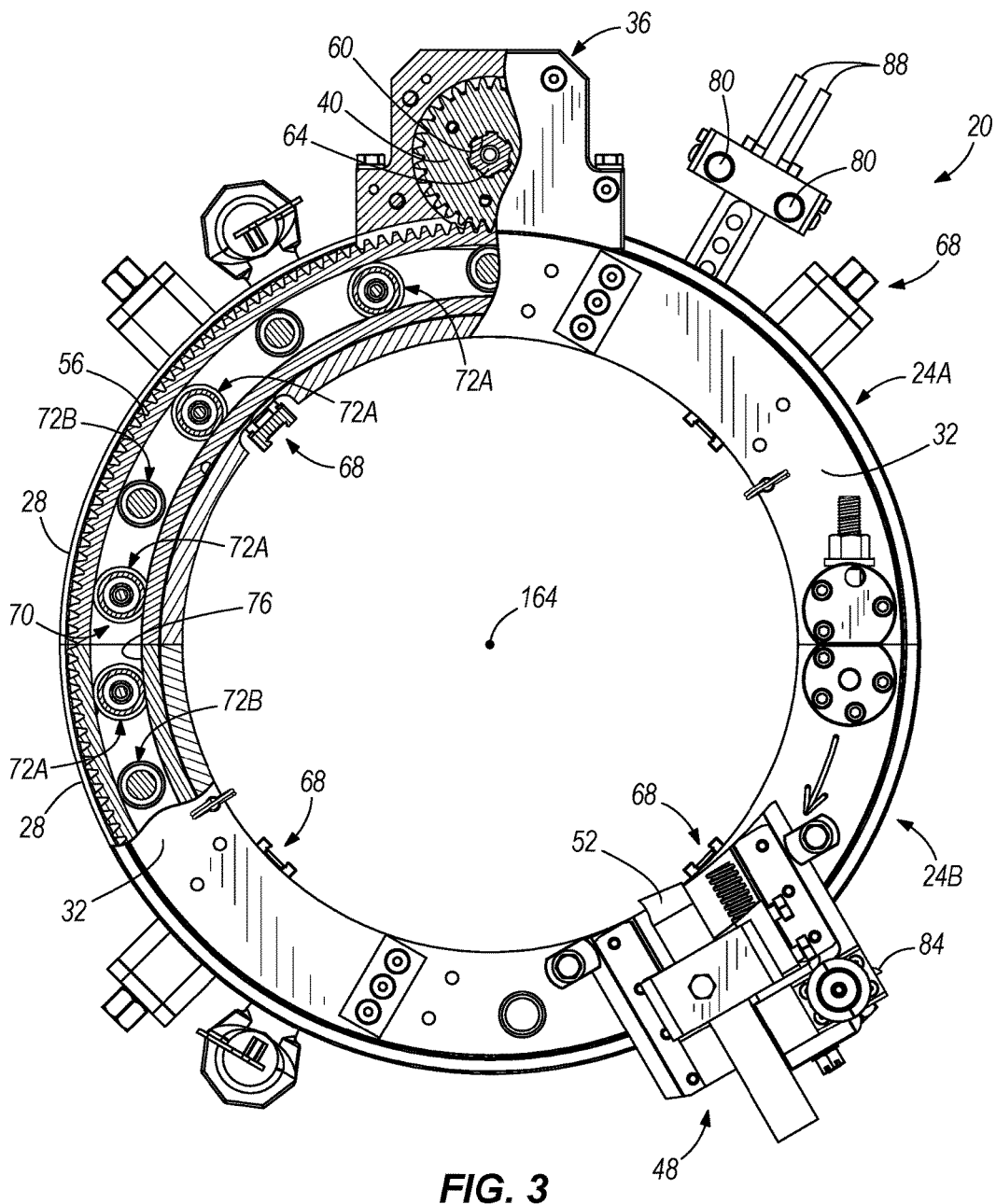
FIG. 3 is a front view of the pipe machining apparatus illustrated in FIG. 1 with a portion thereof broken away to show internal components, including a portion of an exemplary bearing assembly, of the pipe machining apparatus, in accordance with one embodiment.
Figure 4:
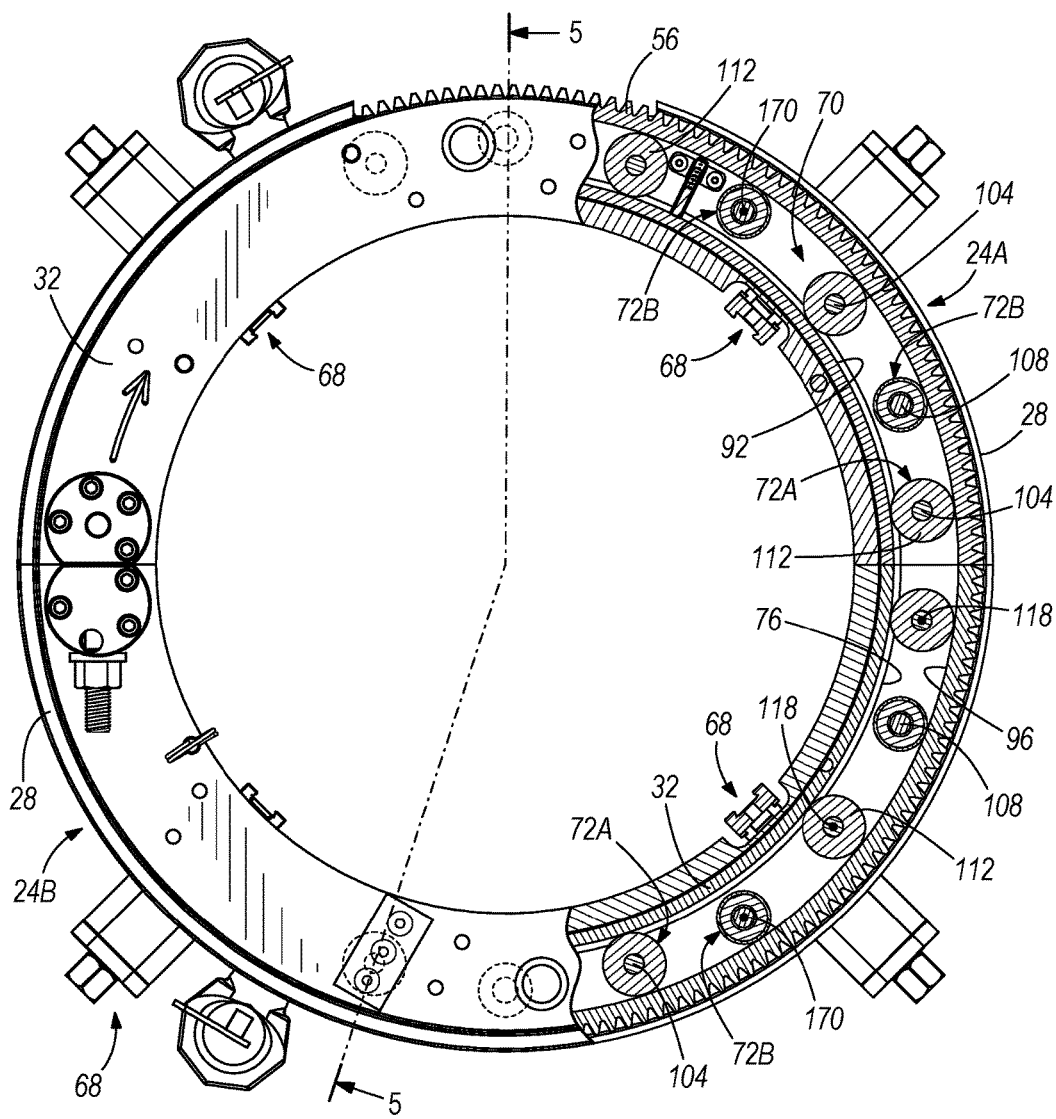
FIG. 4 is another front view of a portion of the pipe machining apparatus with a portion thereof broken away to show a portion of the bearing assembly of the pipe machining apparatus, in accordance with one embodiment.

With reference to FIGS. 1-3, there is shown one exemplary embodiment of a pipe machining apparatus 20 adapted to machine pipes P of varying diameters. In some exemplary embodiments, the apparatus 20 completely cuts through pipes P. In other exemplary embodiments, the apparatus 20 prepares an end of a pipe P for coupling to another pipe. In still other exemplary embodiments, the apparatus 20 both completely cuts and prepares a pipe P for coupling to another pipe.

In the illustrated exemplary embodiment, pipe machining apparatus 20 is formed of two joined-together semicircular sections 24A, 24B and includes a frame 28 and a tool carrier 32. The two sections 24A, 24B together comprise the frame 28 and the tool carrier 32 such that a first portion of the frame 28 and a first portion of the tool carrier 32 are included in one section 24A and a second portion of the frame 28 and a second portion of the tool carrier 32 are included in the other section 24B. The frame 28 has a column 36 extending outwardly of the two semicircular sections 24A, 24B and houses a pinion gear 40 adapted to couple with a suitable drive motor 44, such as an air motor with suitable gear reduction means. The frame 28 is adapted to couple and be fixed relative to a pipe P, and the tool carrier 32 is rotatable relative to the fixed frame 28 and the pipe P. The air motor 44 is adapted to rotate the tool carrier 32 relative to the frame 28 through a gear train in the column 36. The tool carrier 32 has a circular gear rack 56 for meshing with the pinion gear 40 rotatably mounted in column 36. The pinion gear 40 has an opening 60 provided with a polygonal perimeter for receiving a complementary shaped drive head 64 of drive motor 44. Therefore, it can be seen that drive motor 44 is adapted to rotate tool carrier 32 relative to the frame 28 through a gear train provided by pinion gear 40 in column 36 and circular gear rack 56 on the tool carrier 32.

The rotatable tool carrier 32 includes one or more tool supports 48 (two tool supports shown in the illustrated exemplary embodiment), which support tools 52 for performing a cutting or machining operation on the pipe P as the tools 52 rotate circumferentially about the pipe P. The machining operation performed by the tool(s) 52 may form a straight edge perpendicular to a longitudinal extent of the pipe P, a bevel on an end of the pipe P that is transverse to the longitudinal extent of the pipe P and at an angle other than ninety degrees, or an edge of a pipe P having any angle.

The apparatus 20 further includes four adjustable clamp members or coupling members 68 engageable with an exterior of the pipe P and having suitable adjustability to couple and concentrically locate the apparatus 20 to the pipe P.

A plurality of projections 80 are adjustably movable into and out of a path of an advancement member 84 coupled to each tool support 48 to advance the tool 52 toward the pipe P. In the illustrated exemplary embodiment, the apparatus 20 includes a total of two projections 80 for engaging the advancement members 84, however, the apparatus 20 may include any number of projections 80. Each projection 80 is coupled to a lever 88 that may be actuated by a user to selectively move the projection 80 into and out of the path of the advancement members 84.

Figure 5:
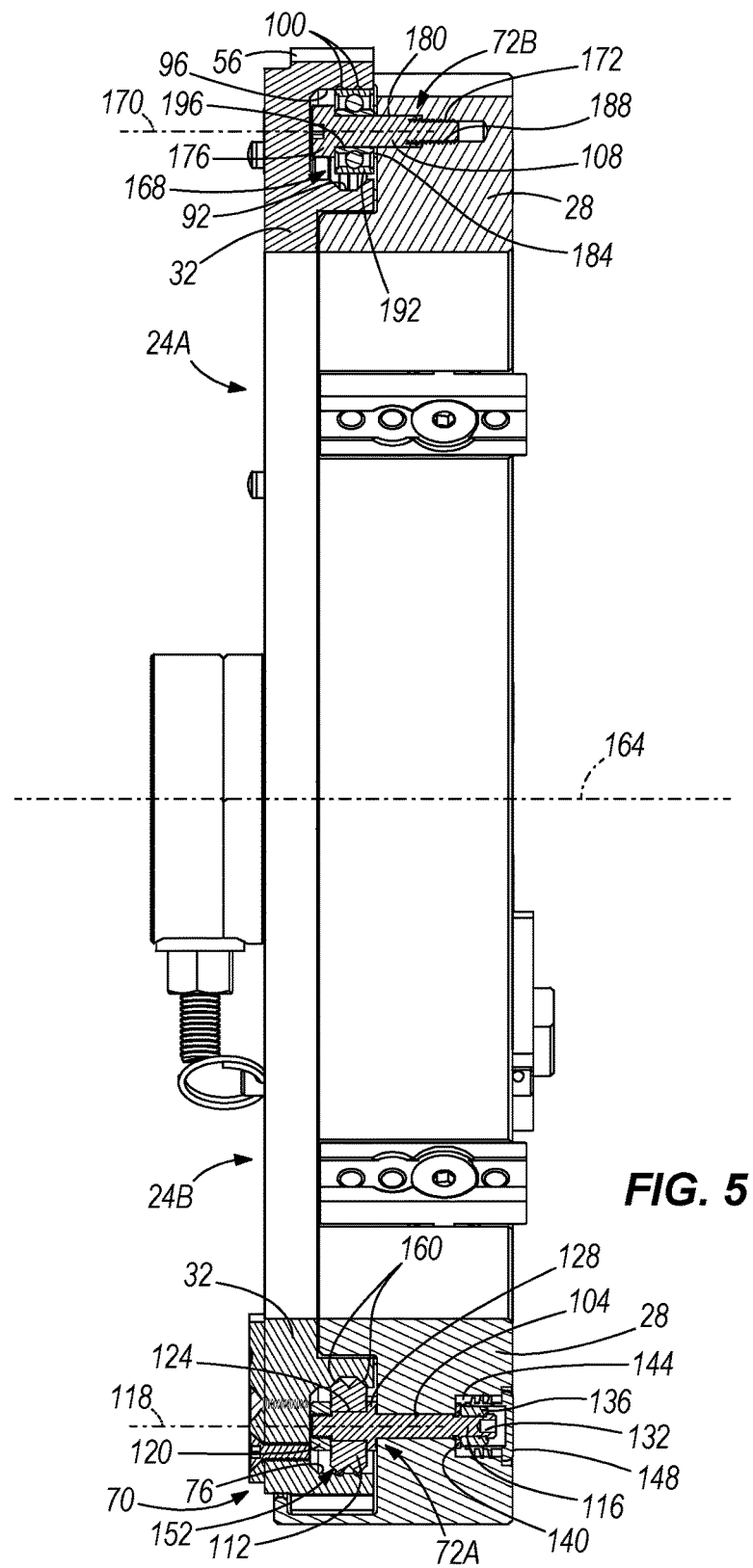
FIG. 5 is cross-sectional view taken along line 5-5 in FIG. 4, in accordance with one embodiment.
Figure 6:
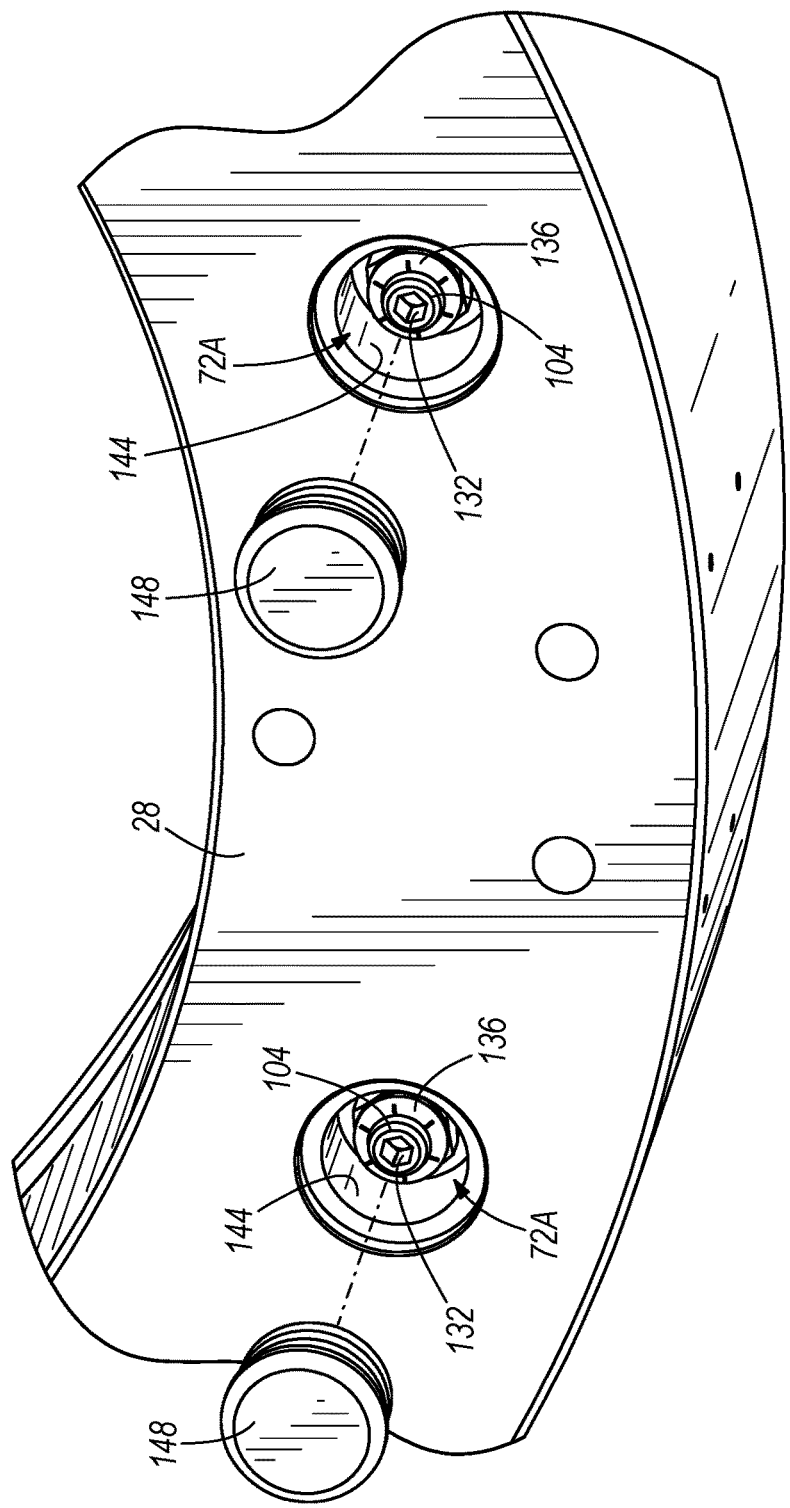
FIG. 6 is a rear perspective view of a portion of the pipe machining apparatus shown in FIG. 2 with exemplary caps exploded from exemplary recesses defined in the pipe machining apparatus, in accordance with one embodiment.

With reference to FIGS. 3-7, tool carrier 32 is rotatably mounted on and supported by frame 28 by a bearing assembly 70 including a plurality of roller bearings 72. The roller bearings 72 ride in a circular bearing race 76 defined in the interior of tool carrier 32. With particular reference to FIG. 5, the circular bearing race 76 includes an indentation or V-groove defined in an interior bearing surface 92 of the race 76 and a substantially flat exterior bearing surface 96. Only a pair of small recesses 100 is defined in the exterior bearing surface 96 of the race and encircle the entire exterior bearing surface 96 of the race 76 (described in more detail below).

The roller bearings 72 comprise two different types of roller bearings. A first type includes an adjustable roller bearing 72A journaled on a shaft 104 and rotatably adjustable in the frame 28. A second type includes a fixed roller bearing 72B journaled on a shaft 108 that is not adjustable in the frame 28. In the illustrated exemplary embodiment, the roller bearings 72A, 72B are disposed around the pipe machining apparatus 20 in an alternating manner (i.e., every other roller bearing is an adjustable roller bearing 72A). In other exemplary embodiments, the different types of roller bearings 72A, 72B may be disposed around the apparatus 20 in any manner, combination, grouping, etc., and all of such possibilities are intended to be within the spirit and scope of the present disclosure.

With continued reference to FIGS. 3-7, each adjustable roller bearing 72A is individually adjustable to adjust a radial position of the roller bearing 72A relative to the circular bearing race 76. Each adjustable roller bearing 72A includes a roller 112 and a shaft 104 with a threaded distal end 116 and an enlarged head 120 at the opposite end. The shaft 104 has an eccentric portion 124 immediately inside enlarged head 120. The roller 112 circumscribes eccentric portion 124 of shaft 104. Therefore, it can be understood that the radial position of each roller 112 relative to bearing race 76 can be changed or adjusted in response to rotational adjustment of shaft 104. Moreover, each roller 112 rotates about a roller axis 118 and it can be understood that the roller axis 118 can be moved or adjusted relative to the frame 28 in response to rotational adjustment of shaft 104.

To this end, roller 112 is sandwiched between enlarged head 120 of shaft 104 and a bushing 128 which engages frame 28. The opposite end of shaft 104 is provided with a tool engagement portion or, in the illustrated exemplary embodiment, a hexagonal socket 132 for receiving an appropriate wrench to rotate the shaft 104 and eccentric portion 124 which is effective to adjust the radial position of roller bearing 72A. It can be seen that the threaded distal end 116, including socket 132, is positioned at and accessible from an exterior of the frame 28 to facilitate adjustment of the roller bearings 72A from outside the apparatus 20.

In order to lock the adjustable roller bearings 72A in any position of radial adjustment, a lock nut 136 is threaded onto distal end 116 of shaft 104 over a washer 140. Once the shaft 104 is rotated by a wrench to bring the respective roller 112 into desired engagement with bearing race 76, nut 136 is tightened to lock the roller bearing 72A in the particular radial position of adjustment. The lock nuts 136 and the respective distal ends 116 of the shafts 104 of the adjustable roller bearings 72A are located in recesses 144 defined in frame 28, which facilitates adjustability of the roller bearings 72A from an exterior of the pipe machining apparatus 20 and eliminates the need to disassemble the pipe machining apparatus 20 (e.g., disassemble the fixed frame 28 and the tool carrier 32) in order to adjust the roller bearings 72A. Caps 148 are positionable in all of the recesses 144 to close off and protect the recesses 144, the lock nuts 136, and the threaded ends 116 of the shafts 104 when adjustability is not desired. The caps 148 may be coupled to the frame 28 in the recesses 144 in any manner such as, for example, press-fit, threaded, detented, or any other manner.

Figure 7:
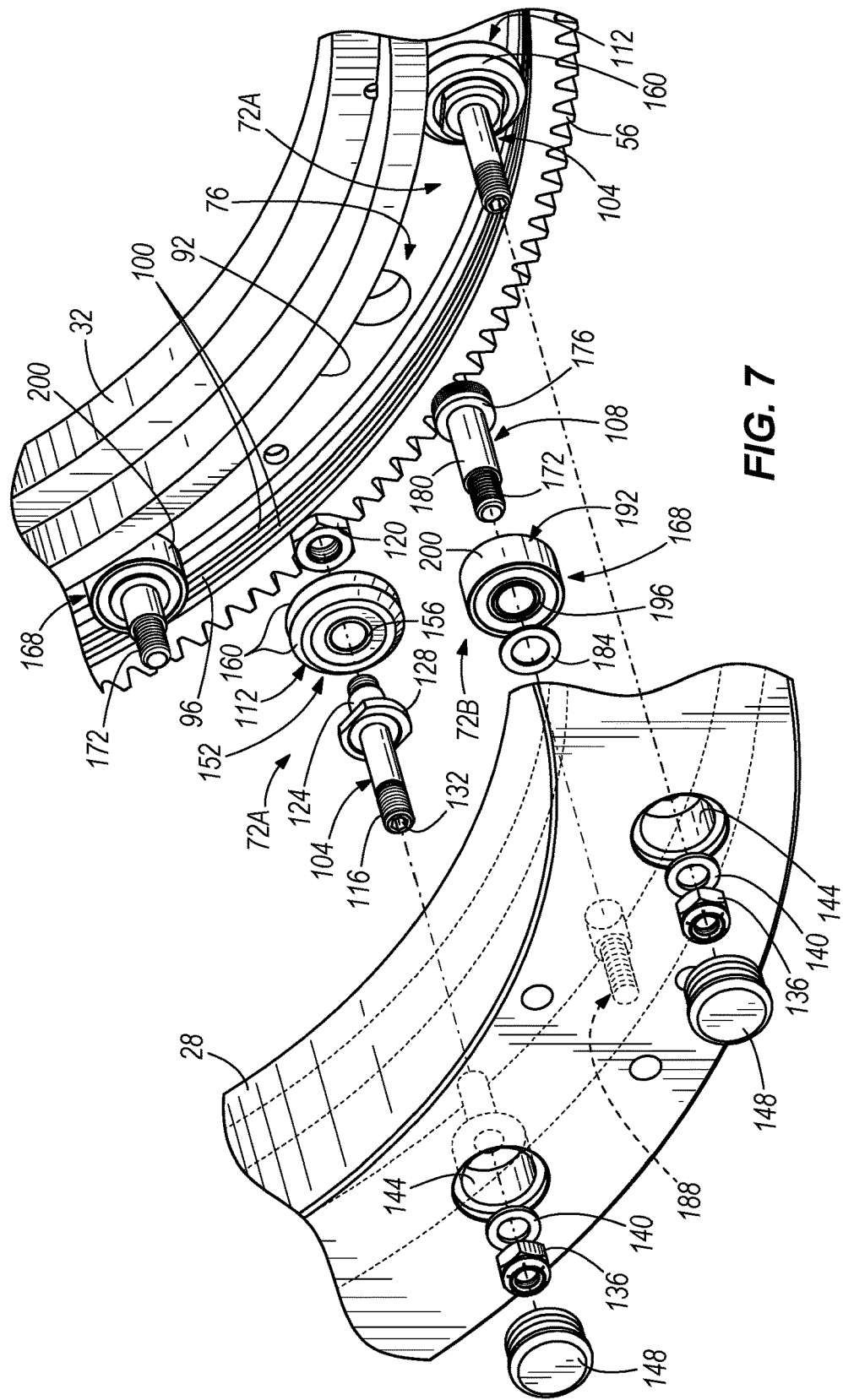
FIG. 7 is an exploded view of a portion of the pipe machining apparatus shown in FIG. 2 showing two different types of exemplary roller bearings, in accordance with one embodiment.

In the illustrated exemplary embodiment, each roller 112 includes an outer circular bearing part 152 and an inner hub 156 (see FIG. 7). Outer bearing part 152 is freely rotatable about hub 156 by means of ball bearings. The outer bearing part 152 includes a V-shaped configuration including two angled engagement portions 160 for engaging a complementary shaped V-groove defined in the interior engagement surface 92 of the race 76. The V-shaped outer bearing part 152 provides dual line contact between the roller 112 and the race 76 with the two lines of engagement angled and non-parallel to each other. In the illustrated exemplary embodiment, both lines of contact are transverse to a rotational axis 164 of the tool carrier 32. In some exemplary embodiments, both lines of contact may be orientated at about a 45 degree angle relative to the rotational axis 164 of the tool carrier 32. In other exemplary embodiments, the lines of contact may be at any angle relative to the rotational axis 164 of the tool carrier 32 including parallel.

The hub 156 is press-fit over eccentric portion 124 of shaft 104 and is positioned between enlarged head 120 and bushing 128 when the bearing 72A is locked in a given position, while outer bearing part 152 is free to rotate and ride along the interior bearing surface 92 of the bearing race 76. The roller 112 and the bearing race 76 are appropriately sized to inhibit the roller 112 of the adjustable bearing 72A from engaging the exterior bearing surface 96 of the bearing race 76. To assist with inhibiting engagement, the exterior bearing surface 96 defines the pair of recesses 100 therein that encircle the entire race 76. The pair of recesses 100 align with the two furthest projecting portions of the V-rollers 112 of the adjustable roller bearings 72A such that the V-rollers 112 do not contact the exterior bearing surface 96 of the race 76.

The adjustable roller bearings 72A are also adapted to provide a preload between the adjustable roller bearings 72A and the fixed roller bearings 72B during assembly of the apparatus 20. When assembling the apparatus 20, the adjustable roller bearings 72A are adjusted or moved into contact with the interior bearing surface 92 of the race 76 resulting in a force applied by the adjustable roller bearings 72A, thereby forcing the fixed roller bearings 72B into engagement with the exterior bearing surface 96 to establish a preload between the adjustable roller bearings 72A and the fixed roller bearings 72B.

With continued reference to FIGS. 3-7, the fixed roller bearings 72B are not adjustable relative to the frame 28. Each fixed roller bearing 72B includes a roller 168 and a shaft 108 with a threaded distal end 172 and an enlarged head 176 at the opposite end. The shaft 108 has a concentric portion 180 immediately inside enlarged head 176 and the roller 168 circumscribes the concentric portion 180 of shaft 108. The roller 168 is sandwiched between the enlarged head 176 and a washer 184 engaging the frame 28. The threaded distal end 172 of the shaft 108 is threaded into an internally threaded cavity 188 defined in the frame 28 to secure the fixed roller bearing 72B relative to the frame 28. The roller 168 rotates about a roller axis 170 and, since the roller bearing 72B is fixed relative to the frame 28, the roller axis 170 is fixed and does not move relative to the frame 28.

In the illustrated exemplary embodiment, each roller 168 includes an outer circular bearing part 192 and an inner hub 196. Outer bearing part 192 is freely rotatable about hub 196 by means of ball bearings. The outer bearing part 192 includes a substantially flat engagement portion 200 for engaging the substantially flat exterior bearing surface 96 of the race 76. The substantially flat engagement portion 200 provides a single line contact between the roller 168 and the exterior race 76. In the illustrated exemplary embodiment, the single line contact is substantially parallel to the rotational axis 164 of the tool carrier 32. Alternatively, the single line contact may be transverse to the rotational axis 164 of the tool carrier 32.

The hub 196 is press-fit over concentric portion 180 of shaft 108 and is positioned between enlarged head 176 and washer 184, while outer bearing part 192 is free to rotate and ride along the exterior bearing surface 96 of the bearing race 76. The roller 168 and the bearing race 76 are appropriately sized to inhibit the roller 168 of the fixed bearing 72B from engaging the interior bearing surface 92 of the bearing race 76. The fixed bearings 72B provides radial support to the tool carrier 32, assist with establishing location of the tool carrier 32, and assists with proper engagement and backlash of the drive pinion gear 40 to the gear rack 56.

During operation of the pipe machining apparatus 20, the tool 52 applies a machining force to a pipe P, which may result in outward radial forces and axial forces on the tool support(s) 48 and the tool carrier 32. These machining forces result in forcing the interior engagement surface 92 of the race 76 more into or against the roller 112 of the adjustable roller bearing 72A, which ensures a reliable and adequate radial engagement between the roller bearing 72A and the race 76. Additionally, these machining forces may result in forcing the tool carrier 32 in an axial direction, which results in forcing the interior engagement surface 92 of the race 76 into or against the two lines of contact provided by the two angled engagement portions 160 of the roller bearing 72A. These features of the roller bearings 72A assist with maintaining proper operation and movement of the tool carrier 32 relative to the fixed frame 28, and additionally may assist with reducing chatter during operation of the pipe machining apparatus 20. Thus, the roller bearings 72A provide both radial and axial support during the machining operation of the pipe cutting apparatus 20.

Conventional pipe machining apparatuses operate in a different manner. Particularly, conventional pipe machining apparatuses include roller bearings within a race, however, a machining force realized by a tool machining a pipe forces the interior engagement surface of the race away from the roller bearings, thereby providing a looser, less reliable, and potentially inadequate engagement between the roller bearing and the race.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A bearing assembly for a pipe machining apparatus, the bearing assembly comprising:

a plurality of fixed and unadjustable roller bearings with each fixed and unadjustable roller bearing including a first shaft and a first roller rotatably coupled to the first shaft, wherein the first roller is rotatable about a first roller bearing axis adapted to remain substantially fixed and unadjustable relative to the pipe machining apparatus; and a plurality of adjustable roller bearings with each adjustable roller bearing including a second shaft and a second roller rotatably coupled to the second shaft, wherein the second roller is rotatable about a second roller bearing axis adapted to move;

wherein the plurality of fixed roller bearings and the plurality of adjustable roller bearings alternate relative to each other.

2. The bearing assembly of claim 1, wherein each of the second shafts of the plurality of adjustable roller bearings includes an eccentric portion about which the second roller is coupled, and wherein each of the second shafts is rotatable to move the second roller bearing axis.

3. A bearing assembly for a pipe machining apparatus, the bearing assembly comprising:

a plurality of fixed roller bearings with each fixed roller bearing including a first shaft and a first roller rotatably coupled to the first shaft, wherein the first roller is rotatable about a first roller bearing axis adapted to remain substantially fixed; and a plurality of adjustable roller bearings with each adjustable roller bearing including a second shaft and a second roller rotatably coupled to the second shaft, wherein the second roller is rotatable about a second roller bearing axis adapted to move;

wherein the plurality of fixed roller bearings and the plurality of adjustable roller bearings alternate relative to each other;

wherein each of the second shafts of the plurality of adjustable roller bearings includes a tool engagement portion on an end thereof to facilitate rotation of the second shafts.

4. A bearing assembly for a pipe machining apparatus, the bearing assembly comprising:

a plurality of fixed roller bearings with each fixed roller bearing including a first shaft and a first roller rotatably coupled to the first shaft, wherein the first roller is rotatable about a first roller bearing axis adapted to remain substantially fixed; and a plurality of adjustable roller bearings with each adjustable roller bearing including a second shaft and a second roller rotatably coupled to the second shaft, wherein the second roller is rotatable about a second roller bearing axis adapted to move;

wherein the plurality of fixed roller bearings and the plurality of adjustable roller bearings alternate relative to each other;

wherein each of the first rollers includes a first inner hub and a first outer part rotatable about the first inner hub with the first outer part including a substantially flat engagement surface, and wherein each of the second rollers includes a second inner hub and a second outer part rotatable about the second inner hub with the second outer part including two angled engagement surfaces.

5. The bearing assembly of claim 4, wherein the substantially flat engagement surfaces of the first rollers are substantially parallel to a rotational axis of the pipe machining apparatus, and wherein the two angled engagement surfaces of the second rollers are transverse to the rotational axis of the pipe machining apparatus.

* * * * *